US012695223B2

(12) United States Patent
Li et al.

(10) Patent No.: US 12,695,223 B2
(45) Date of Patent: Jul. 28, 2026

(54) DIFFERENTIAL I/O CARD USING CMT CONNECTOR

(71) Applicant: Intel Corporation, Santa Clara, CA (US)

(72) Inventors: Xiang Li, Portland, OR (US); Konika Ganguly, Portland, OR (US); Tongyan Zhai, Portland, OR (US); George Vergis, Portland, OR (US); Anthony M. Constantine, Portland, OR (US); Jun Liao, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 130 days.

(21) Appl. No.: 17/871,611

(22) Filed: Jul. 22, 2022

(65) Prior Publication Data

US 2022/0360002 A1 Nov. 10, 2022

Related U.S. Application Data

(60) Provisional application No. 63/348,988, filed on Jun. 3, 2022.

(51) Int. Cl.
*H01R 12/72* (2011.01)
*G06F 1/185* (2026.01)
*H01R 13/24* (2006.01)

(52) U.S. Cl.
CPC ........... *H01R 12/721* (2013.01); *G06F 1/185* (2013.01); *H01R 13/2407* (2013.01); *H01R 2201/06* (2013.01)

(58) Field of Classification Search
CPC .............. H01R 12/721; H01R 13/2407; H01R 2201/06; G06F 1/185; G06F 3/0655
(Continued)

(56) References Cited

U.S. PATENT DOCUMENTS 5,959,370 A 9/1999 Pardo
6,241,531 B1 6/2001 Roath et al.
(Continued)

FOREIGN PATENT DOCUMENTS

CN 101452324 B * 2/2012 ............. G06F 1/185
CN 109683077 A * 4/2019 ......... G01R 31/2601
(Continued)

OTHER PUBLICATIONS

Dell's DDR5 Camm Appears in More Detail_ TheLostSwede_ Apr. 1-15, 2022.
(Continued)

*Primary Examiner* — Abdullah A Riyami
(74) *Attorney, Agent, or Firm* — Compass IP Law PC

(57) ABSTRACT

Methods and apparatus for differential I/O (input/output) cards using compression mount technology (CMT) connectors. Assemblies include a CMT connector having an array of spring-loaded pins or contacts that are configured to contact respective CMT contact pads on a pair of printed circuit board (PCBs), such as an add-in card (AIC) and a motherboard. Stacked assemblies are also disclosed including multiple CMT AIC or PCIe modules communicatively coupled using on module CMT connectors. The connector solutions may be used for AICs without changing the overall PCB form factor outline of existing AICs employing edge connectors. Under a stacked assembly of multiple CMT PCIe modules interconnected by on module CMT connectors, wiring in the PCBs is configured to provide signaling supporting multi-lane PCIe or CXL links for each CMT PCIe module. The CMT connector approach also is scalable and can support more pins/contacts to facilitate additional I/O bandwidth.

19 Claims, 12 Drawing Sheets

(58) Field of Classification Search
    USPC ........................................................ 439/152
    See application file for complete search history.

(56)                      References Cited

U.S. PATENT DOCUMENTS

|  |  |  |  |  |
|---|---|---|---|---|
| 6,354,844 | B1 | 3/2002 | Coico et al. | |
| 6,979,784 | B1 | 12/2005 | Duley | |
| 7,427,809 | B2 | 9/2008 | Salmon | |
| 8,094,455 | B2 * | 1/2012 | Hong-Chi | H01R 12/716 |
| | | | | 361/719 |
| 8,282,402 | B2 * | 10/2012 | Ngo | H01R 13/6273 |
| | | | | 439/79 |
| 8,690,589 | B2 * | 4/2014 | Ngo | H01R 12/721 |
| | | | | 439/79 |
| 9,536,593 | B1 | 1/2017 | Peterson et al. | |
| 9,575,519 | B2 * | 2/2017 | Yin | G06F 1/185 |
| 11,074,952 | B1 * | 7/2021 | Schnell | G11C 5/066 |
| 11,321,009 | B2 * | 5/2022 | Schnell | G11C 11/161 |
| 11,394,141 | B2 * | 7/2022 | Schnell | H05K 1/141 |
| 12,349,274 | B2 | 7/2025 | Rao et al. | |
| 2003/0231476 | A1 * | 12/2003 | Vinson | G06F 1/186 |
| | | | | 361/798 |
| 2005/0245105 | A1 * | 11/2005 | Driscoll | H01R 12/7011 |
| | | | | 439/65 |
| 2008/0254657 | A1 * | 10/2008 | Sun | H01R 13/52 |
| | | | | 439/152 |
| 2011/0151701 | A1 * | 6/2011 | Ngo | H01R 12/732 |
| | | | | 439/327 |
| 2011/0226462 | A1 | 9/2011 | Sato et al. | |
| 2013/0005190 | A1 * | 1/2013 | Blanchfield | H01R 12/721 |
| | | | | 439/629 |
| 2013/0039016 | A1 * | 2/2013 | Wu | G06F 1/185 |
| | | | | 361/729 |
| 2013/0055192 | A1 | 2/2013 | Colbert et al. | |
| 2013/0094167 | A1 * | 4/2013 | Chen | G06F 1/185 |
| | | | | 361/791 |
| 2015/0171535 | A1 | 6/2015 | Li et al. | |
| 2016/0056560 | A1 | 2/2016 | Farkas et al. | |
| 2016/0170928 | A1 * | 6/2016 | Tamarkin | H05K 5/0286 |
| | | | | 710/313 |
| 2017/0069369 | A1 | 3/2017 | Kim et al. | |
| 2017/0286353 | A1 * | 10/2017 | Tamarkin | G06F 13/4282 |
| 2019/0051641 | A1 | 2/2019 | Lee et al. | |
| 2019/0052008 | A1 * | 2/2019 | Consoli | H05K 7/1417 |
| 2019/0114109 | A1 | 4/2019 | Arora et al. | |
| 2019/0206827 | A1 | 7/2019 | Eskandar | |
| 2020/0019519 | A1 | 1/2020 | Johnson et al. | |
| 2020/0388598 | A1 | 12/2020 | Azeroual et al. | |
| 2021/0321516 | A1 | 10/2021 | Rao et al. | |
| 2021/0349144 | A1 * | 11/2021 | Zhang | G01R 31/2808 |
| 2021/0408704 | A1 | 12/2021 | Li et al. | |
| 2022/0028848 | A1 | 1/2022 | Baek | |
| 2022/0344309 | A1 | 10/2022 | Schnell et al. | |
| 2022/0360002 | A1 | 11/2022 | Li et al. | |
| 2022/0361328 | A1 | 11/2022 | Li et al. | |
| 2022/0394853 | A1 | 12/2022 | Shi et al. | |
| 2023/0005882 | A1 | 1/2023 | Vergis et al. | |
| 2023/0007775 | A1 | 1/2023 | Li et al. | |
| 2023/0120513 | A1 | 4/2023 | Kong et al. | |
| 2023/0353151 | A1 | 11/2023 | Lee et al. | |
| 2024/0364037 | A1 | 10/2024 | Hanks et al. | |

FOREIGN PATENT DOCUMENTS

| | | | | |
|---|---|---|---|---|
| CN | 113059811 | A | 7/2021 | |
| JP | 3208606 | B2 | 9/2001 | |
| WO | WO-9616532 | A1 * | 5/1996 | H05K 7/20445 |

OTHER PUBLICATIONS

Extended European Search Report for Patent Application No. 23170057.6, Mailed Oct. 31, 2023, 8 pages.
Final Office Action for U.S. Appl. No. 17/871,686, Mailed Nov. 12, 2025, 23 pages.
First Office Action for U.S. Appl. No. 17/354,540, Mailed Aug. 13, 2024, 16 pages.
First Office Action for U.S. Appl. No. 17/871,542, Mailed Aug. 6, 2025, 29 pages.
First Office Action for U.S. Appl. No. 17/871,686, Mailed Aug. 6, 2025, 21 pages.
First Office Action for U.S. Appl. No. 17/902,740, Mailed Nov. 5, 2025, 11 pages.
Intel compression mount technology—An overview—_Underfox_ Dec. 1-10, 2024.
Notice of Allowance for U.S. Appl. No. 17/354,540, Mailed Mar. 24, 2025, 8 pages.
Notice of Allowance for U.S. Appl. No. 17/871,542, Mailed Nov. 25, 2025, 15 pages.
Restriction Requirement for U.S. Appl. No. 17/971,442, Mailed Dec. 23, 2025, 6 pages.

* cited by examiner

DIFFERENTIAL I/O CARD USING CMT CONNECTOR

CLAIM OF PRIORITY

This application claims the benefit of the filing date of U.S. Provisional Application No. 63/348,988, filed Jun. 3, 2022, entitled "DIFFERENTIAL I/O CARD USING CMT CONNECTOR" under 35 U.S.C. § 119(e), which is incorporated in its entirety herewith.

BACKGROUND INFORMATION

Edge connectors are widely used for add-in cards (AICs) in high-speed differential I/O (input/output) applications. For example, most desktop computers include multiple PCIe (Peripheral Component Interconnect Express) expansion slots with connectors mounted to the motherboard that are configured to interface with edge connectors on PCIe AICs (also referred to as expansions cards). This PCIe connectors are mounted perpendicular to the motherboard PCB (printed circuit board).

Laptop and notebook computers have limited space for AICs. To address this, PCI-SIG (Special Interest Group), the PCIe standards body, developed and standardized the PCIe M.2 card edge and mating PCIe M.2 connector, which is a right-angle connector that enables the AIC to be installed parallel to the motherboard. Examples of a solid-state drive (SSD) M.2 edge card 100 and an M.2. connector 120 are shown in FIGS. 1*a* and 1*b*.

SSD edge card 100 includes a PCB 102 including an PCIe M.2 edge connector 104, Various integrated circuits (aka chips) and other electronic components are mounted to PCB 102, including a memory controller chip 106, a DRAM memory chip 108, and a pair of non-volatile (NV) memory chips 110 and 112. PCIe M.2 edge connector has a Key B+M form factor with pins on a single side (the top side of SSD edge card 100 in this example).

PCIe M.2 connector 120 includes a body 122 having a slot in which edge contacts 124 are disposed. The edge contacts 124 are electrically coupled to contacts 126, which are soldered to pads in the motherboard PCB (or other type of PCB). When installed in PCIe M.2 connector 120, the pins in PCIe M.2 edge connector are electrically coupled to edge contacts 124, and thus to the pads in the PCB.

The PCIe M.2 connector was designed for PCIe3 and PCI 4 ($3^{rd}$ and $4^{th}$ generation) standards. For high speed I/O, such as PCIe5 (PCIe $5^{th}$ generation), the M.2 connector shows performance degradation. The connector performance improvement is critical for higher data rate I/O applications. In addition, the pin count of this connector is not scalable with given PCIe edge card form factor, which limit the bandwidth of the card.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 6*a* shows wiring connected a first array of CMT contact pads to pins on an on module CMT connector and FIG. 6*b* shows wiring connecting a second array of CMT contact pads to a chip mounted to the CMT AIC module;

FIG. 8*a* shows wiring connected a first array of CMT contact pads to pins on an on module CMT connector and FIG. 8*b* shows wiring connecting a second array of CMT contact pads to a PCIe ASIC on the CMT PCIe module;

DETAILED DESCRIPTION

Figure 1A:
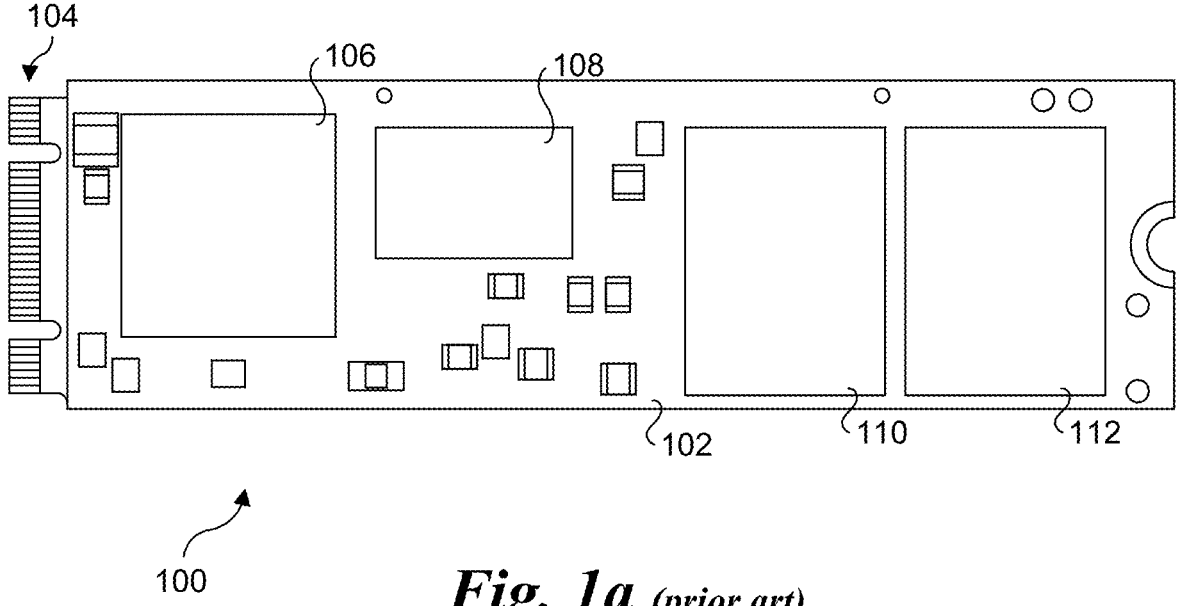
FIG. 1*a* shows an NVMe SSD card including a PCIe M.2 edge connector.
Figure 1B:
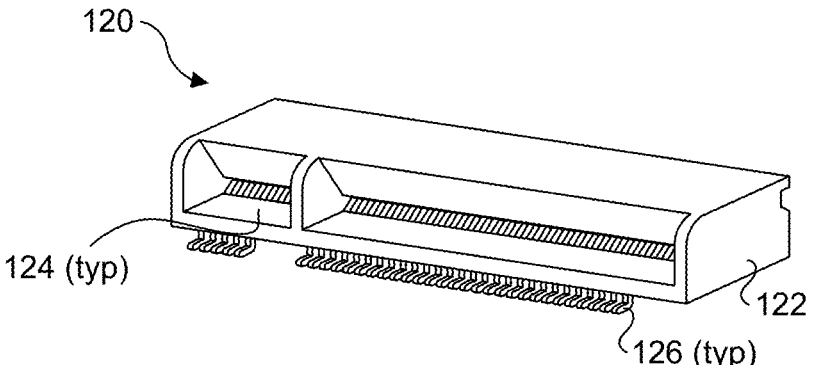
FIG. 1*b* shows a right-angle PCIe M.2 connector.

Embodiments of methods and apparatus for differential I/O cards using compression mount technology (CMT) connectors are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with an aspect of the embodiments described and illustrated herein, connector solutions employing CMT connector technology are provided that provide better performance that current right-angle edge connectors, such as PCIe M.2 connectors. The performance improvements include better impedance control and less crosstalk. The solutions may be used for AICs without changing the overall PCB form factor outline. Thus, existing AICs could be easily modified to be configured to be used with a CMT connector with minimal changes to the board design other than replacing the existing edge connector with an array of pads. The CMT connector approach also is scalable and can support more pins to facilitate additional I/O bandwidth. The solutions also have a low profile that reduces the Z height when compared to existing right-angle edge connectors.

Figures 2A, 2B:
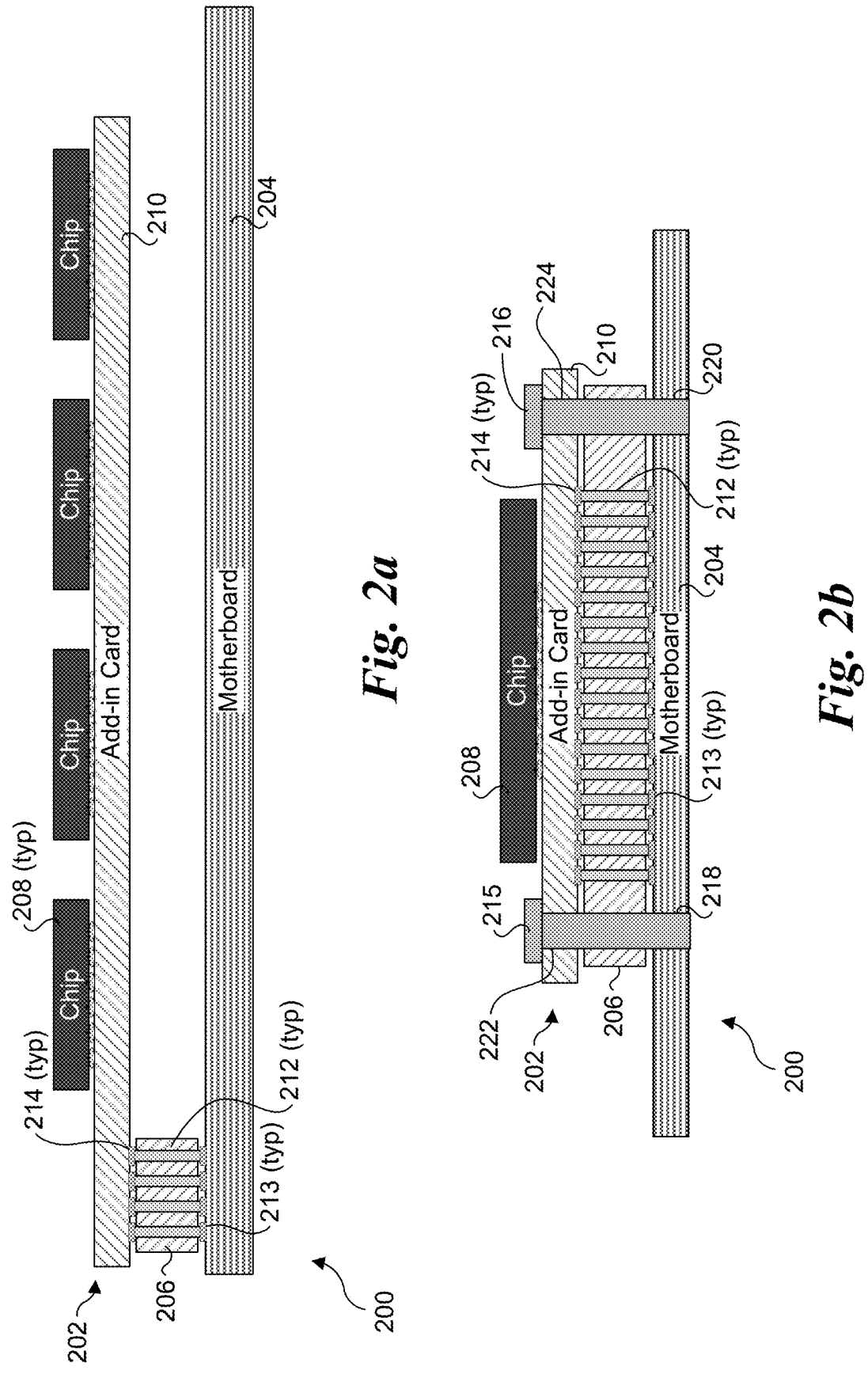
FIG. 2*a* is a diagram showing a side cross-section view of an assembly including an add-in card (AIC) coupled to a motherboard via a compression mount technology (CMT) connector, according to a first embodiment.
FIG. 2*b* is a diagram showing an end cross-section view of the assembly of FIG. 2*a;*

FIG. 2a shows a side cross-section view of an assembly 200 including an AIC 202 coupled to a motherboard 204 via a CMT connector 206, while FIG. 2b shows an end cross-section view of the same assembly 200. AIC 202 includes multiple chips 208 (e.g., various chips implemented by an AIC) coupled to a PCB 210. In one embodiment, chips 208 are mounted to solder pads on the top surface of PCB 210 (not shown) using solder bumps. Other types of packaging technologies may also be used. CMT connector includes an array of CMT pins 212 that are spring-loaded at opposing ends and include lobes that contact respective CMT contact pads 213 on the top layer of motherboard 204 and CMT contact pads 214 on the underside of PCB 210. As shown in FIG. 2b, assembly 200 is coupled together using a pair of screws 215 and 216 that are screwed into respective threads 218 and 220 in motherboard 204. Also, a pair of holes 222 and 224 are formed in PCB 210 having a size that matches the shoulder diameter of screws 215 and 216.

Figures 3A, 3B:
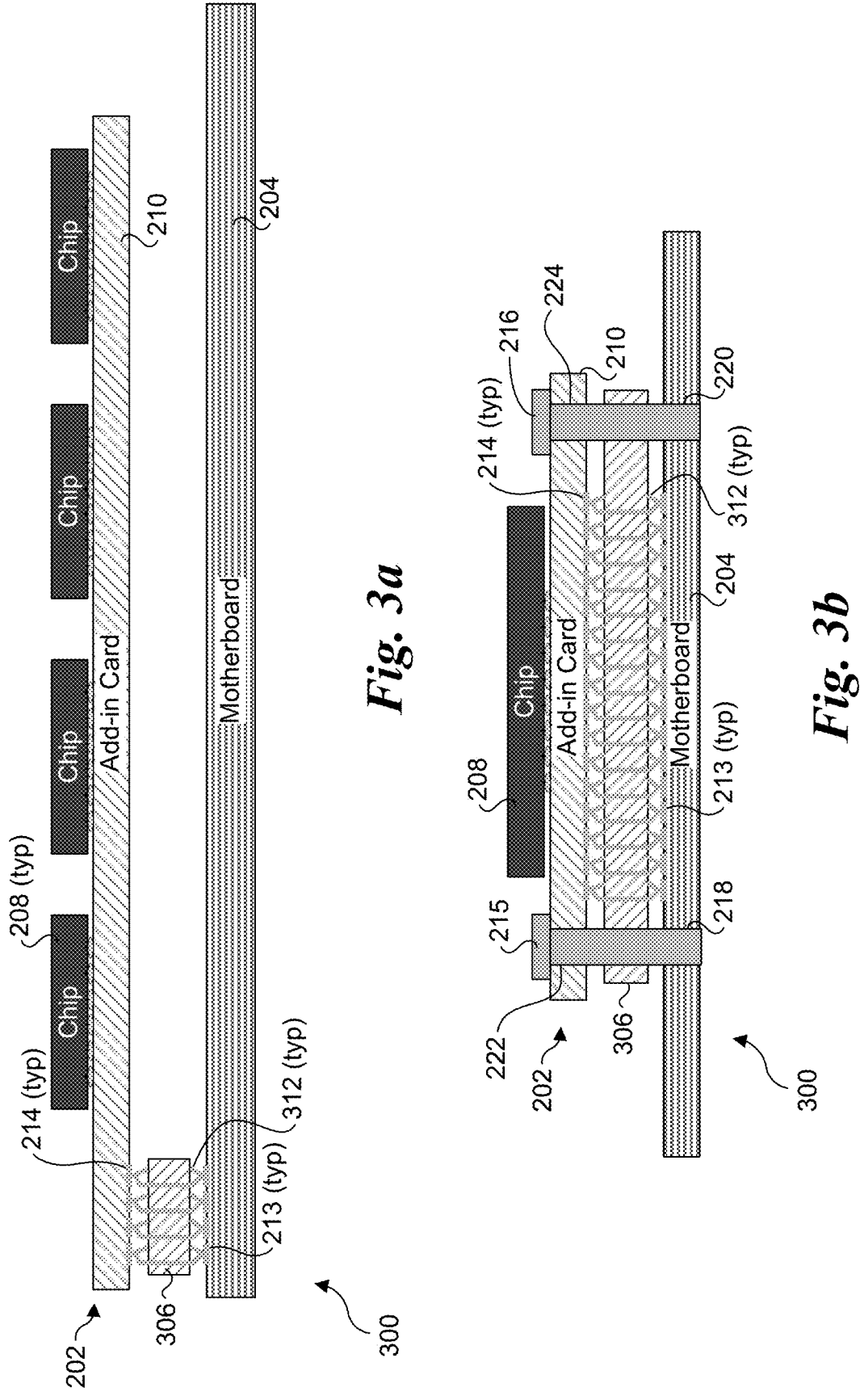
FIG. 3*a* is a diagram showing a side cross-section view of an assembly including an AIC coupled to a motherboard via a CMT connector, according to a second embodiment.
FIG. 3*b* is a diagram showing an end cross-section view of the assembly of FIG. 3*a;*

FIGS. 3a and 3b respectively show a side cross-section view and an end cross-section view of an assembly 300 that employs a CMT connector 306 in place of CMT connector 206. Components with like-numbered references in assemblies 200 and 300 are similar in both embodiments. For CMT connector 306, the spring-loaded pins 212 are replaced with spring-loaded contacts 312.

Figures 4A, 4B, 4C:
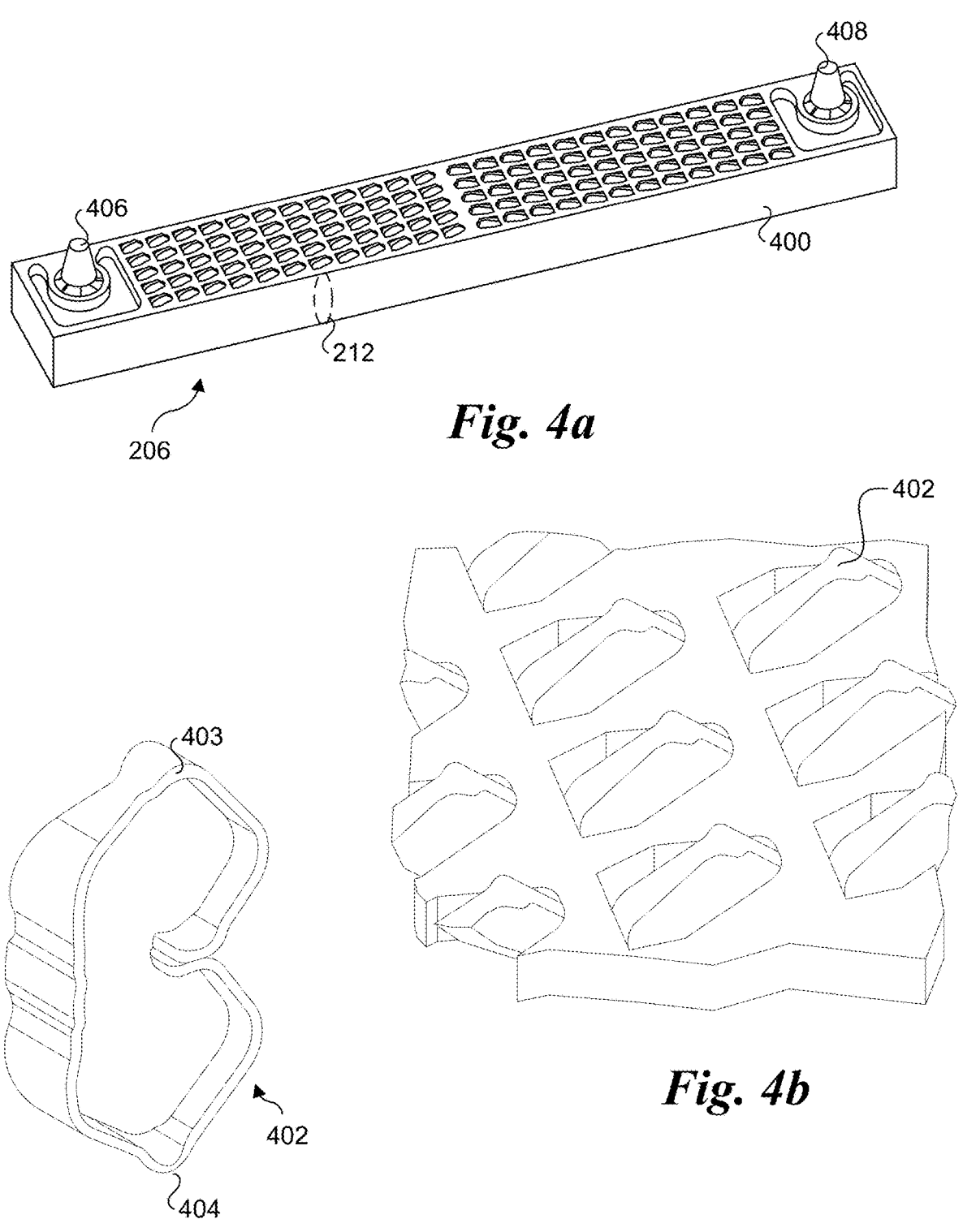
FIG. 4*a* shows a 3D view of a CMT connector, according to one embodiment
FIG. 4*b* shows a close-up view of the top of the spring contact structure used for the CMT pins.
FIG. 4*c* shows a 3D view of a spring contact used for the CMT pins, according to one embodiment.

FIG. 4a shows a 3D view of a CMT connector 206, according to one embodiment. CMT connector 206 includes a body 400 in which arrays of CMT pins 212 are installed. As shown in FIGS. 4b and 4c, the CMT pins include a pair of spring contacts that are installed in opposing ends of tubes that are compressed when CMT connector 206 is installed in assembly 200. As shown in FIG. 4c, a spring contact 402 comprises a bent structure made of a suitable metal and includes a pair of lobes 403 and 404; when two spring contacts 402 are installed in a tube and the components of assembly 200 are assembled, lobe 403 will contact a contact pad 214 on AIC 202 while lobe 404 will contact a contact pad 213 on motherboard 204. The tubes are disposed in respective holes in body 400, and the spring contacts 402 are inserted into the opposing ends of the tubes.

For CMT connector 306 shown in FIGS. 3a and 3b, CMT contacts 312 comprise a single member made of a suitable metal. The CMT contacts may be embedded in the body of CMT connector 306 when formed, or inserted into suitable holes or apertures formed in the CMT connector body during a separate manufacturing operation.

Figures 5A, 5B:
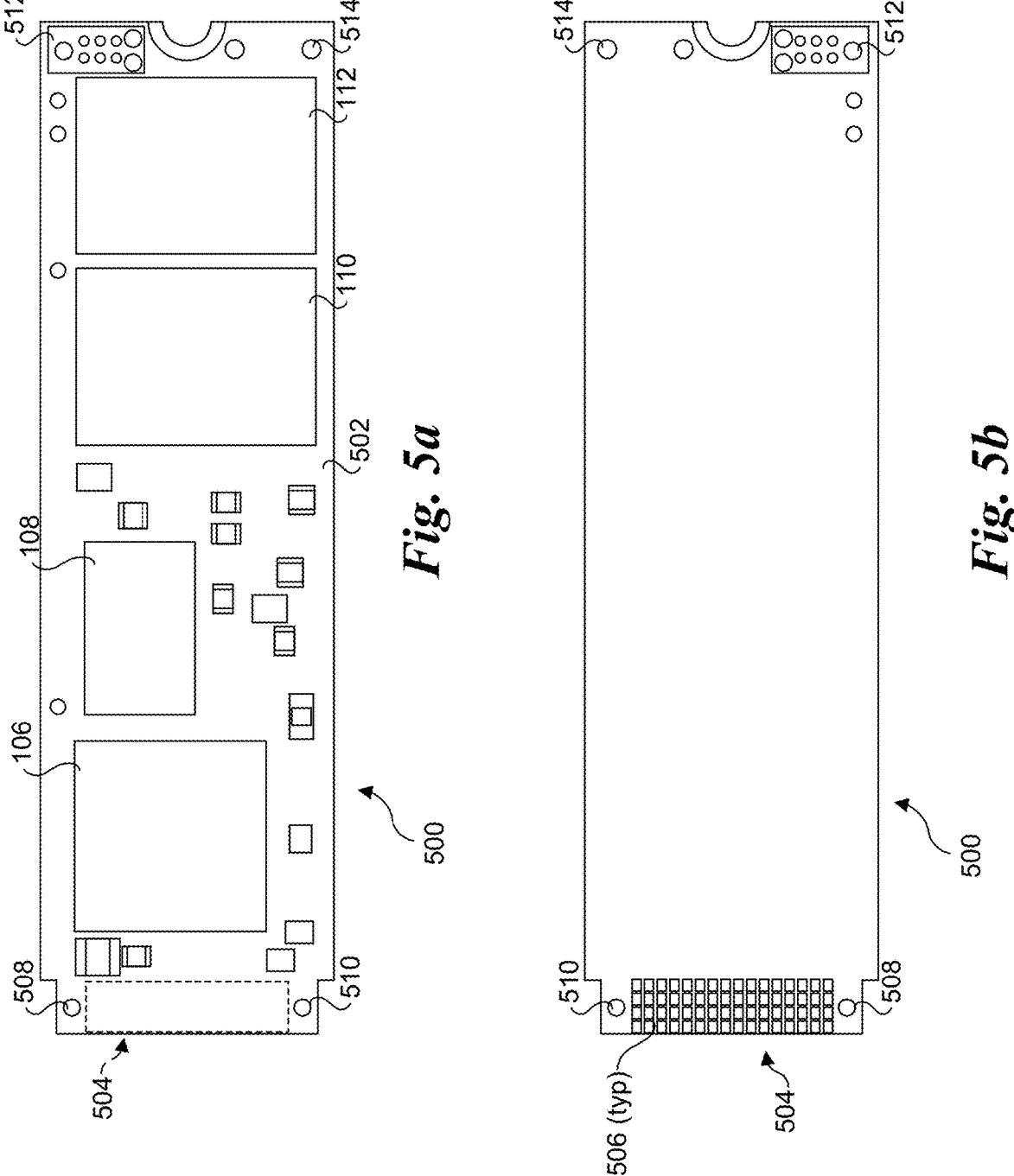
FIGS. 5*a* and 5*b* respectively show topside and underside views of a first NVMe SSD card including a first array of pads that are used to connect to mating pins or contacts in a CMT connector.

FIGS. 5a and 5b show topside and underside views of an NVMe SSD 500 illustrating a first example of AIC 202. NVMe SSD 500 includes a PCB 502 to which various chips and other electronic components are mounted, including a memory controller chip 106, a DRAM memory chip 108, and a pair of non-volatile (NV) memory chips 110 and 112. Under an aspect of the embodiments herein, the form factor of the AIC PCB remains substantially the same as existing AICs, except the PCIe M.2 edge connector is replaced with an array 504 of CMT pads 506 formed on the underside of the PCB in the illustrated embodiment. PCB 502 also includes alignment holes 508 and 510 in which a pair of screws would be inserted, with the diameter of the alignment holes matching the diameter of the shoulders of the screws. It is further noted that screws and/or additional alignment mechanisms may be used. For example, additional screws or alignment dowels or the like may be inserted in holes 512 and 514 in PCB 502.

Signal traces (e.g., wiring) in PCB 502 are used to provide signal paths between pads 506 and memory controller chip 106 and other electronic components on NVMe SSD 500. Upon installation of NVMe SSD 500 (e.g., in a laptop or notebook computer), pads 506 are electrically coupled to respective pins 212 or contacts 312 in the CMT connector (206 or 306), which in turn are coupled to CMT contact pads 213 on motherboard 204.

Figures 5C, 5D:
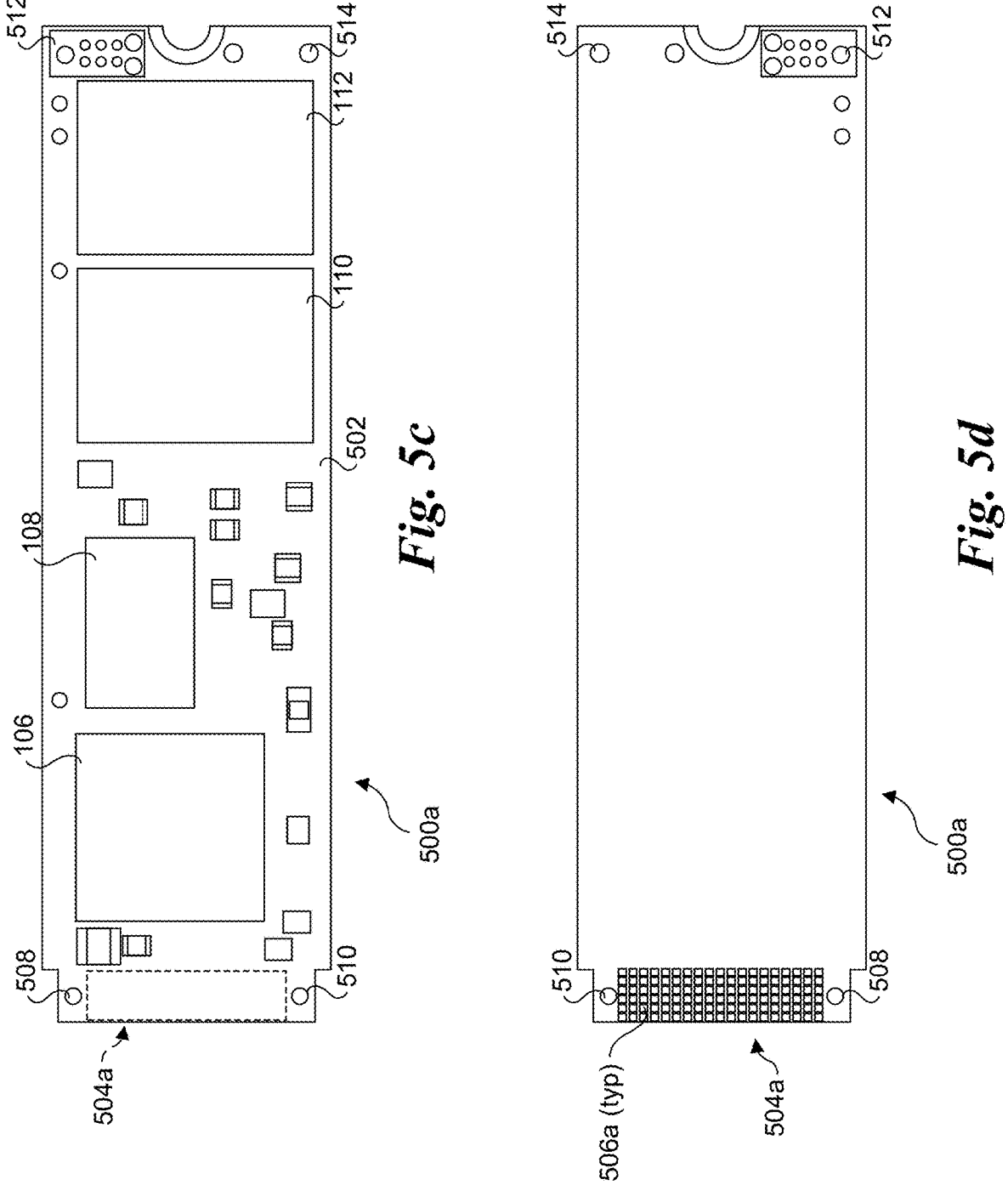
FIGS. 5*c* and 5*d* respectively show topside and underside views a second NVMe SSD card including a second array of pads that are used to connect to mating pins or contacts in a CMT connector.

The number of pads, dimensions of the array, size of the pads, and pitch are all parameters that may be varied to suit the needs of a given application. In some embodiments, the number of pads may be substantially more than the number of pins on conventional PCIe M.2 edge connectors (or other types of edge connectors). For example, FIGS. 5c and 5d show topside and underside views of an NVMe SSD 500a illustrating a second example of an AIC 202 including an array 504a of 120 CMT contact pads 506a. This enables support for a larger number of I/O signals and an increase in I/O bandwidth. It is also noted, the teachings and principles disclosed herein are not limited to AICs with existing form factors, but may be implemented using a variety of different form factors. For example, in some embodiments the size of the array of pads may be larger than would fit using an identical form factor of a given AIC, requiring the end of the AIC PCB with the pads to be extended.

Figure 6:
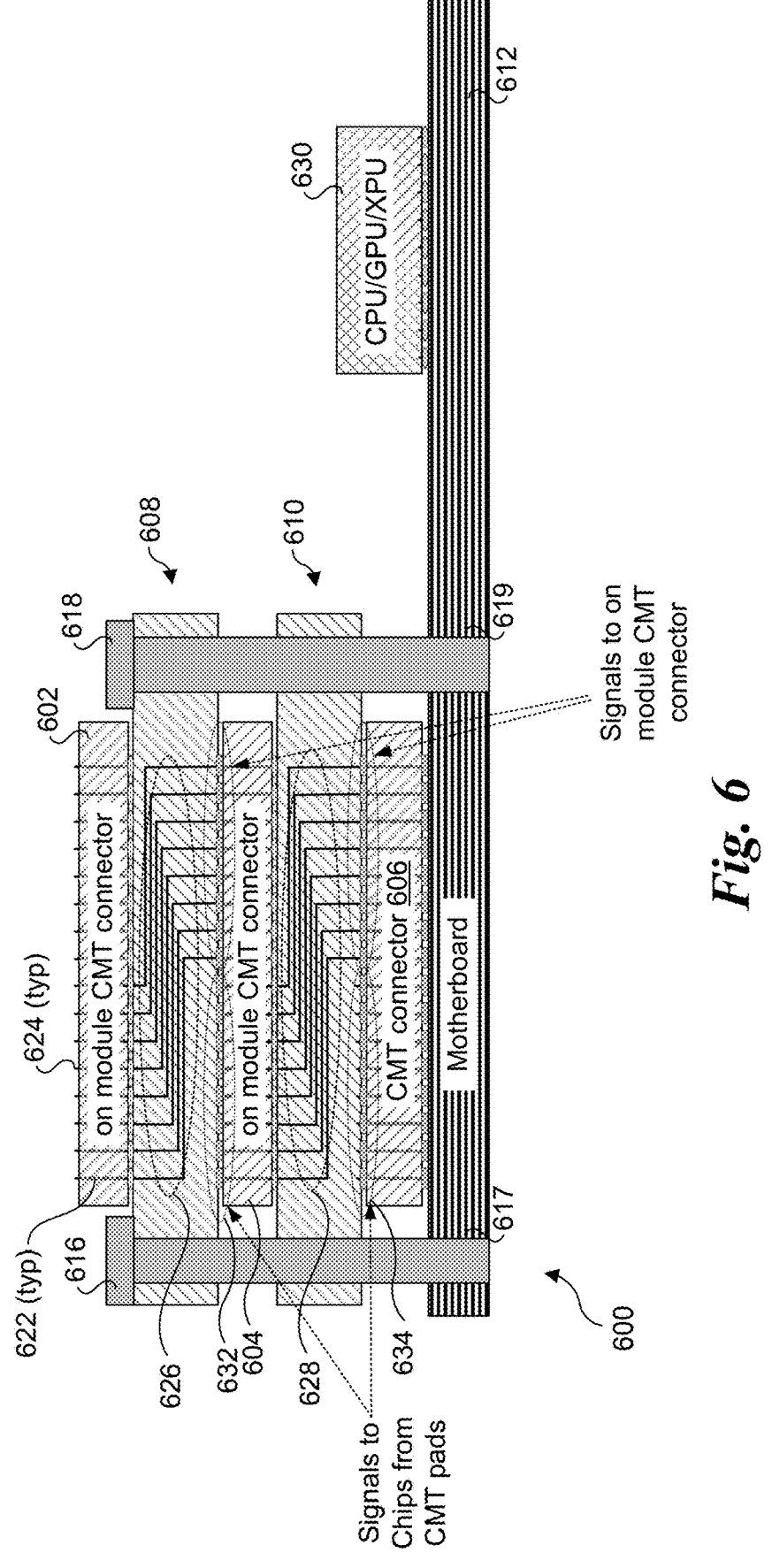
FIG. 6 shows a cross-section view of an assembly comprising a stacked structure a pair of CMT AIC modules including on module CMT connectors, where the lower CMT AIC module is coupled to a motherboard via CMT connector.

FIG. 6 shows a cross-section view of an assembly 600 comprising a stacked structure including a two on module CMT connector 602 and 604, a CMT connector 606, a pair of CMT AIC modules 608 and 610, and a motherboard 612. In this example, CMT connector 602 is not being used but is shown to illustrate the stacked structure may be extended to support additional CMT AIC modules and/or a CMT AIC module with an on module CMT connector may be used as the top CMT AIC module. As shown in FIG. 6b, each of CMT AIC modules 608 and 610 include one or more chips 614 and/or other components that are mounted to a substrate or PCB using a known technique, such as using solder bumps. Generally, instances of chip 614 in the embodiments illustrated herein are generically representative of various chips, circuitry, and components that may be included on an AIC to support one or more associated functions. For example, an SSD AIC might include a NVM controller chip, a DRAM chip, and one or more NV memory chips, while a Wireless Local Area Network (WLAN) or Wireless Wide Area Network (WWAN) AIC may include applicable WLAN or WWAN chips and associated circuitry. Other non-limiting examples of AICs include COMMS devices, Artificial Intelligence (AI) and/or Machine Learning (ML) inference engines, etc. Generally, the chips may be any type of integrated circuit including but not limited to Application Specific Integrated Circuits (ASICs), programmable ICs (e.g., Field Programmable Gate Arrays), processors, controllers and micro-controllers, memory devices, storage devices, accelerators, etc.

Assembly 600 is coupled together via two or more fasteners, such as depicted by screws 616 and 618, which are threaded into respective threads 617 and 619 in motherboard 612. In one embodiment (not shown) two screws and two guide pins are used. In some embodiments, screws or other types of fasteners are used toward each end of the AIC PCB (screws/fasteners at right end are not shown in the Figures herein).

Each of on module CMT connectors 602 and 604 have a similar configuration and include an array of CMT pins 622 installed in respective holes in a connector body with spring contacts 624 extending above the body. Signal paths 626 and 628 are formed in respective CMT AIC modules 608 and 610 to route signals between the on module CMT connectors 602, 604, and CMT connector 606, eventually reaching motherboard 612. These signals are further connected to a pads or pins on a CPU (Central Processing Unit) or GPU or XPU 630 mounted to motherboard 612 via wiring in motherboard 612 (wiring not shown). The signal paths to the AIC memory devices that are coupled to the CMT contact pads are shown as stubs 632 and 634 for simplicity in FIG. 6—a representation of these signal paths is shown in FIG. 6b below. Under the routing paths that are illustrated, the signals between motherboard 612 that reach CMT AIC modules 608 and 610 are split, enabling twice the amount of memory devices to be used within the same board footprint using the stacked structure employed by assembly 600. In some embodiments, stacked AIC modules may include AICs with different configurations and/or support different functions.

Figure 6A:
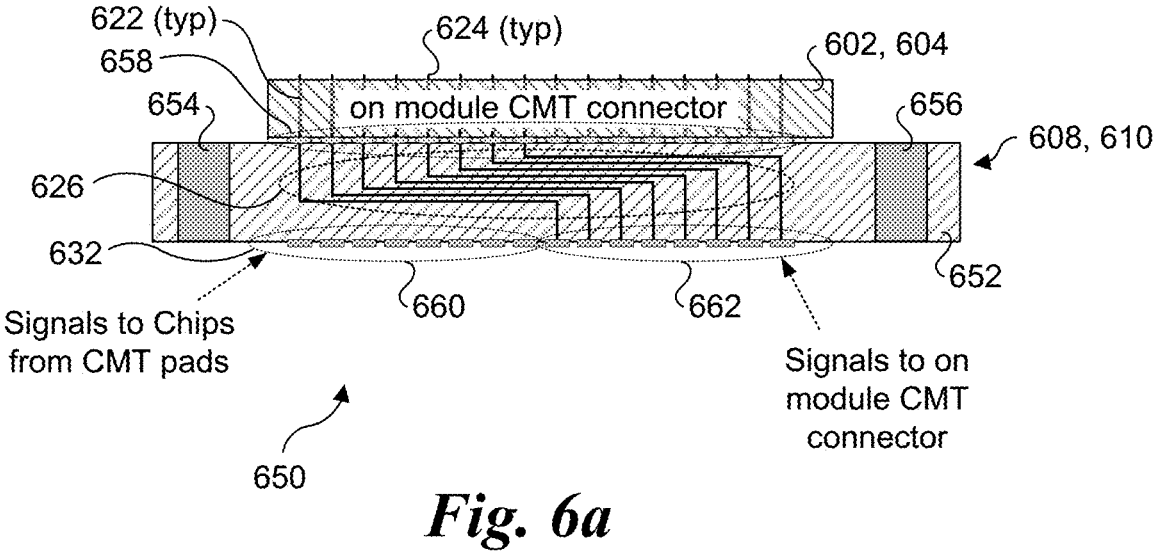
FIGS. 6*a* and 6*b* show cross-section views illustrating further details of the structure of a CMT AIC module, where
Figure 6B:
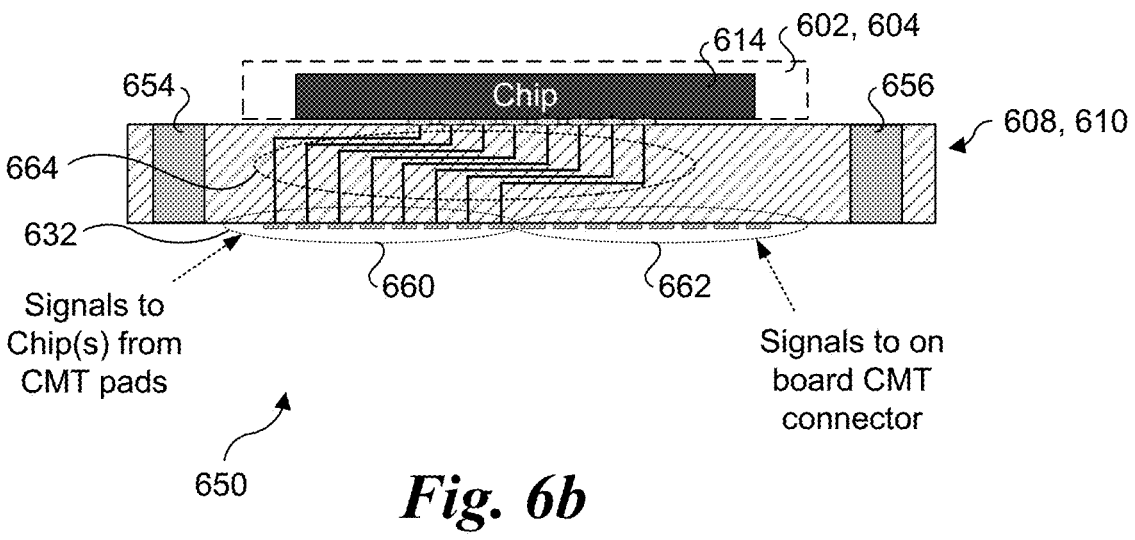

FIGS. 6a and 6b shows further details of an assembly 650 comprising CMT AIC module 608 with on module CMT connector 602. CMT AIC module 608 includes a substrate 652 (e.g., a PCB or any other type of suitable substrate) in which holes 654 and 656 are formed. In one embodiment, holes 654 and 656 are illustrative of two holes that are sized for the shoulders of screws or other types of fasteners. Under another embodiment, four holes are used, two of which are sized for the shoulders of screws or other types of fasteners and two of which are size for alignment pins/dowels or the like.

Pins 622 include a conductive portion or member that extends downward below the CMT connector body into array of vias formed on top of substrate 652 and are coupled to respective signal paths 626 using an array of solder balls 658. For example, in one embodiment, a pin 622 includes a tube that extends below the connector body with a spring contact 624 inserted into a top portion of the tube. In another embodiment, pins 622 are a single piece with an integrated spring contact (or otherwise have a spring-type characteristic to enable the top of the pins to be compressed).

There are two arrays of CMT contact pads 660 and 662 formed on the underside of substrate 652. CMT contact pads in array 662 are connected to pins 622 via signal paths 626 formed in substrate 652. For simplicity, these paths are shown as two-dimensional (2D) paths. In practice, some of the paths may employ 3D routing. As will be recognized by those skilled in the PCB arts, 3D routing may employ a combination of internal vias that are connected via 2D path segments in different layers of substrate 652 (e.g., different layers of a PCB).

FIG. 6b shows 2D signal paths 664 that are coupled between pins or pads on an AIC chip 614 and CMT contact pads in array 660. As above, in practice signal paths 664 may employ 3D routing. It will also be recognized that the number of signal paths illustrated in the Figures herein are less than what would be used in an actual implementation.

Figures 7A, 7B:
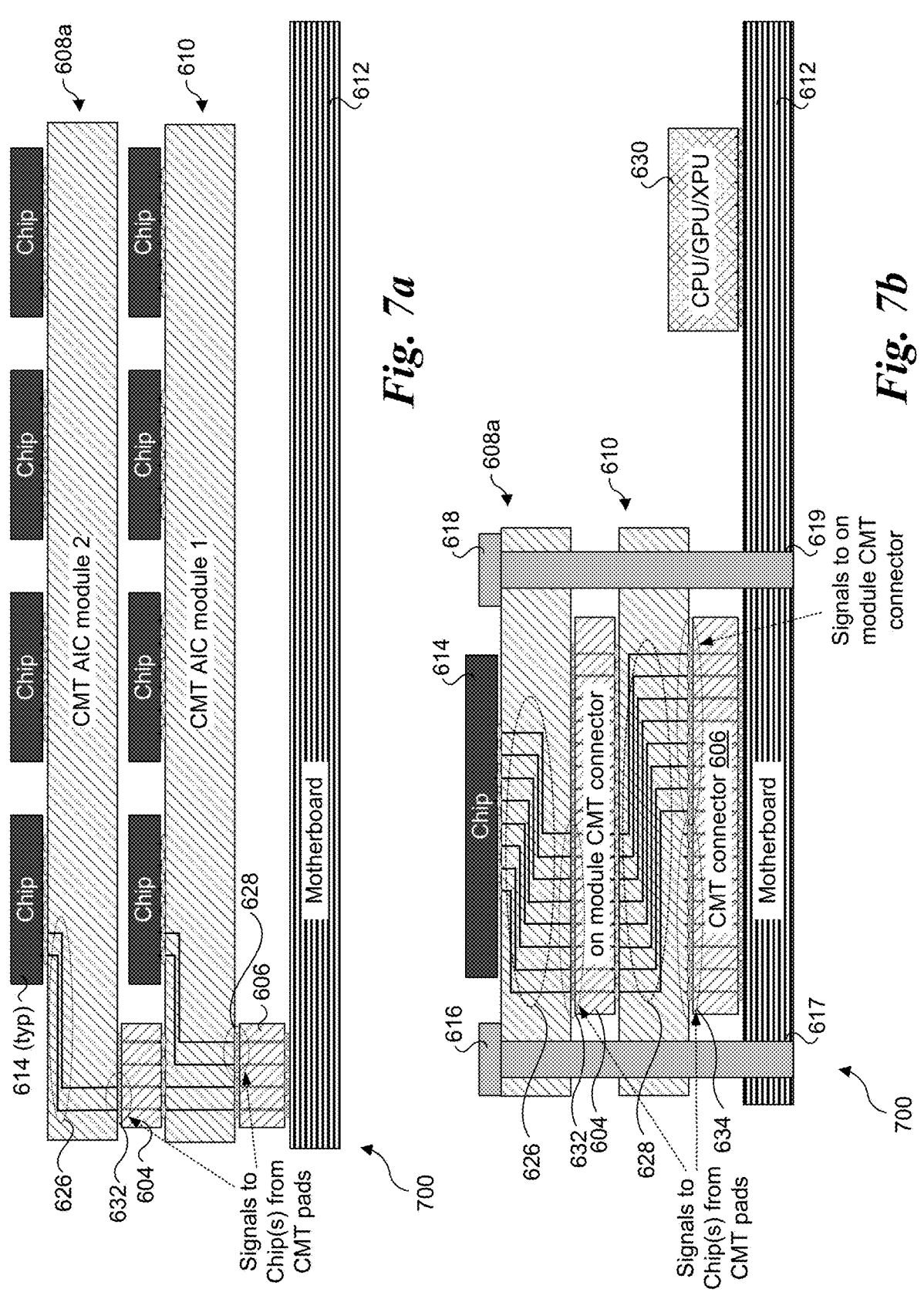
FIG. 7*a* shows a cross-section side view of a stacked assembly including a pair of CMT AIC modules where the top CMT AIC module does not include an on-module CMT connector.
FIG. 7*b* shows a cross-section end view of the stacked assembly of FIG. 7*a;*

FIGS. 7a and 7b shows an alternative embodiment of a stacked assembly 700, wherein CMT AIC module 608 with on module CMT connector 602 has been replaced by a CMT AIC module 608a that does not include an on module CMT connector. As shown in FIG. 7b, the configuration and structure of CMT AIC module 608a is similar to CMT AIC module 608, except CMT AIC module 608a does not include signal paths 626 nor vias that would be connected to pins 622 via solder balls 658. Also, for a CMT AIC module occupying the top of the stacked structure, AIC chips 614 may be arranged different relative to their configuration for a CMT AIC module in the middle of the stack and/or include additional AIC chips 614. In some embodiments where the top CMT AIC module includes additional AIC chips, the number of signal paths and CMT contact pads in both the top CMT AIC module and the other components beneath is (including on module CMT connectors and CMT AIC modules) may increase.

In some embodiments, the CMT AIC modules employ PCIe signaling and protocols. In one embodiment, a Compute Express Link (CXL) protocol is implemented over PCIe links. In some embodiment employing PCIe and/or CXL, at least a portion of the signals coupled via CMT connector 606 and on module CMT connector 604 are provided to a first chip (e.g., the leftmost chips in FIG. 7a) providing a PCIe/CXL interface, such as a PCIe/CLX ASIC (application specific integrated circuit).

It will be recognized that under some embodiments, all pins in a CMT connector and associated CMT contact pads may not be used for carrying any signals or otherwise couple supply voltages or ground. This will enable use of off-the-shelf CMT connectors that may be available from different manufacturers, such as but not limited to Amphenol®. Of course, custom CMT connectors may also be used. In some embodiments, CMT pins/contact pads that are not used for data signals are used for providing power and ground. In some embodiments, ground CMT pins/contact pads are interspersed among data CMT pins/contact pads to reduce crosstalk.

PCIe Signal Bifurcation

The PCIe interface supports link bifurcation where a PCIe interface supporting 16 lanes (×16) from a host can be divided into 2 sets of 8×PCIe links of 4 sets of 4×PCIe links. This allows 2 or 4 independent devices to be connected to a single ×16 link instead of a single device. This allows more devices to be connected to a host if higher number of links are not needed by PCIe devices, such as AICs. An example of this is SSDs may only need 4 links while a GPU may need 16 links. PCIe interfaces supporting 32 lanes (×32) may also be split in a similar manner.

Figure 8:
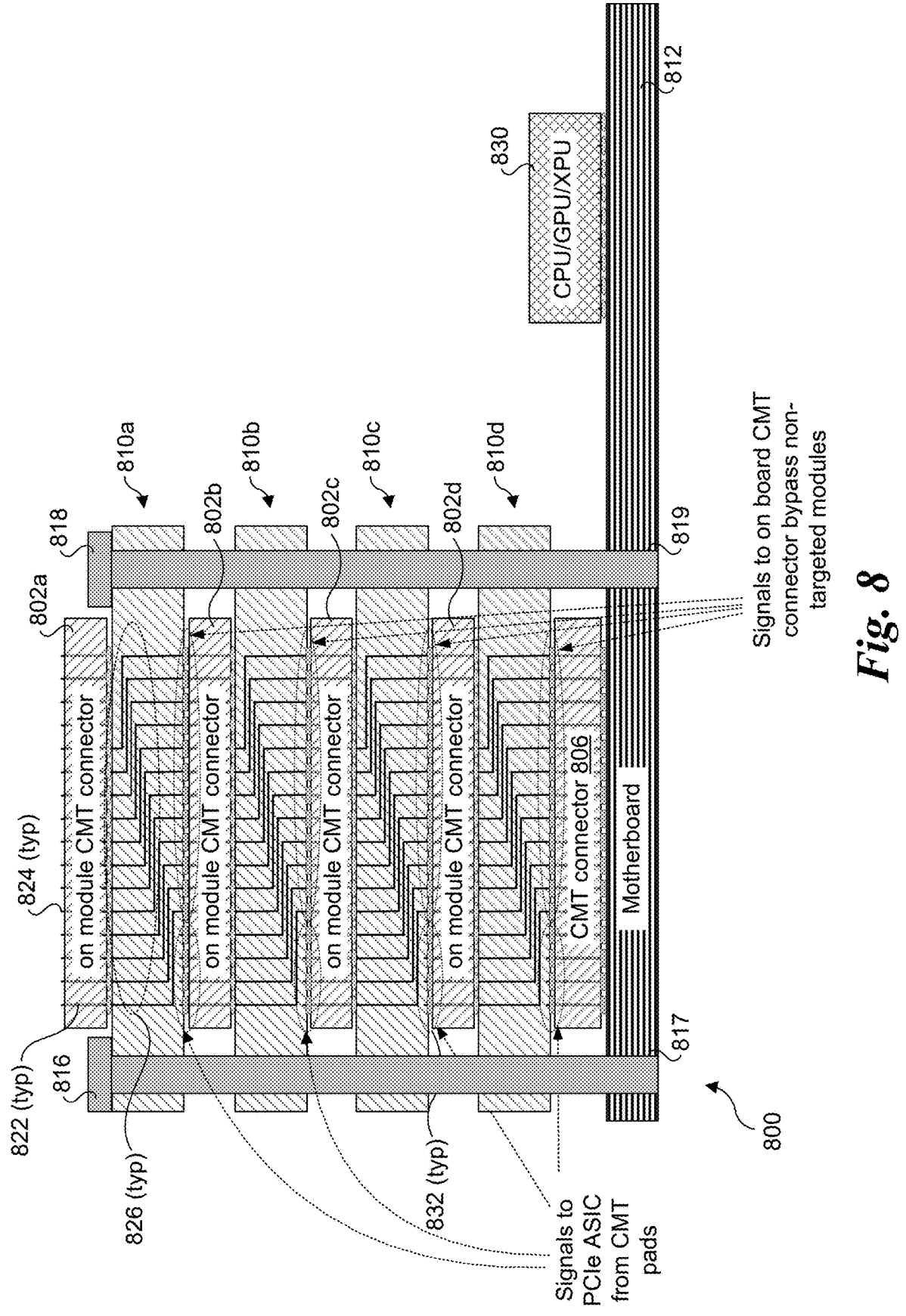
FIG. 8 shows a cross-section view of a stacked assembly including four CMT PCIe modules including on module CMT connectors that are coupled to a motherboard via a CMT connector.

Under additional aspects of the embodiments described and illustrated herein, PCIe signal bifurcation supported using CMT connectors (to motherboard and on-module CMT connectors) using stacked assemblies including two or more CMT PCIe modules. As example of a stacked assembly 800 including four CMT PCIe modules 810*a*, 810*b*, 810*c*, and 810*d* and four on module CMT connectors 802*a*, 802*b*, 802*c*, and 802*d* is shown in FIG. 8. Stacked assembly 800 further includes a motherboard 812 and a CMT connector 806.

Figures 8A, 8B, 8C:
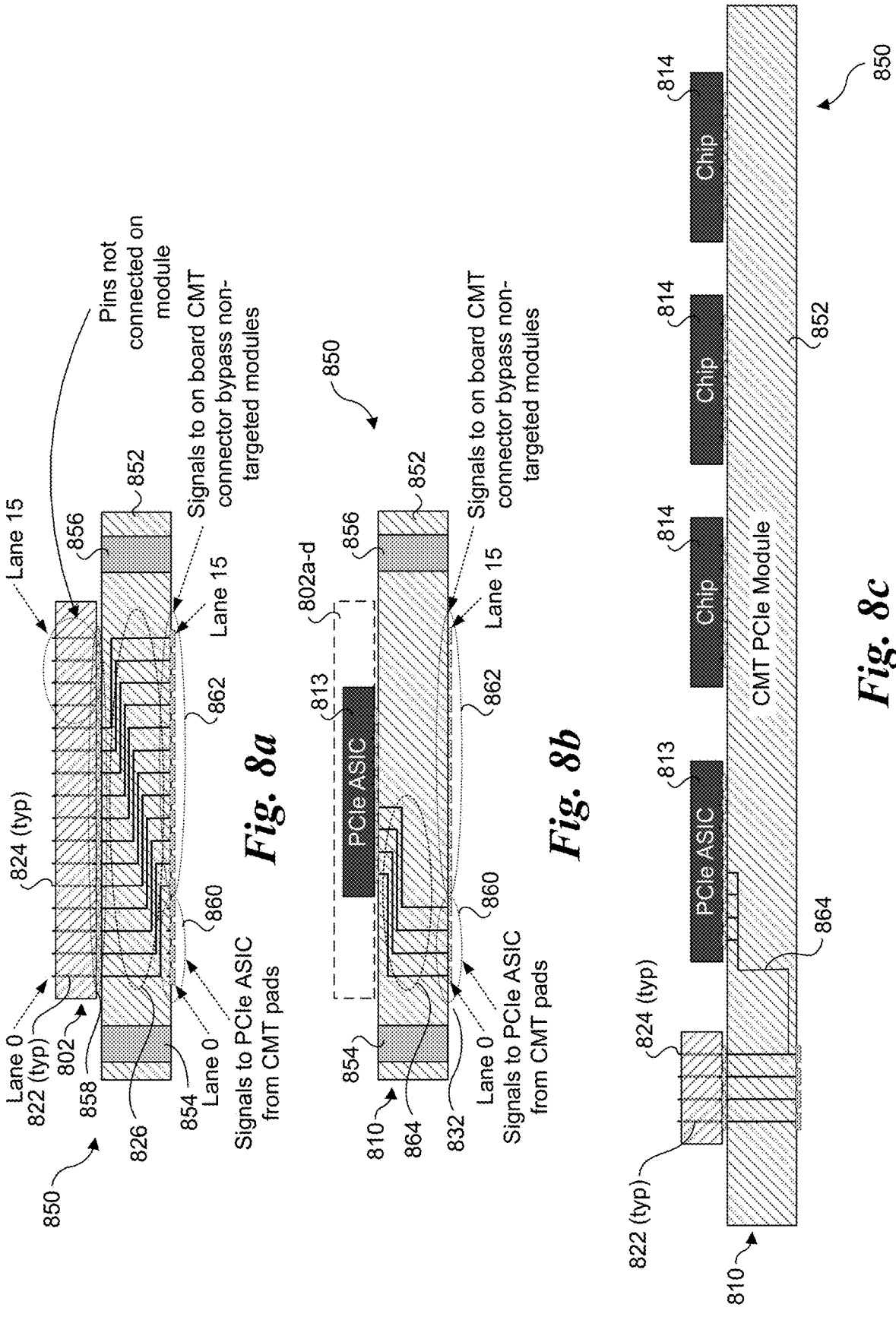
FIGS. 8*a* and 8*b* show cross-section views illustrating further details of the structure of a CMT PCIe module, where
FIG. 8*c* shows a cross section side view of the CMT PCIe module of FIGS. 8*a* and 8*b.

As shown in FIG. 8*c*, a CMT PCIe module 810 includes a PCIe ASIC 813 and one or more chips 814 that are mounted to a substrate or PCB 852 using a known technique, such as using solder bumps. Assembly 800 is coupled together via two or more fasteners, such as depicted by screws 816 and 818, which are threaded into respective threads 817 and 819 in motherboard 812. In one embodiment (not shown) two screws and two guide pins are used. In some embodiments, screws or other types of fasteners are used toward each end of the substrate/PCB (screws/fasteners at right end are not shown in the Figures herein).

Each of on module CMT connectors 802*a-d* have a similar configuration and include an array of CMT pins 822 installed in respective holes in a connector body with spring contacts 824 extending above the body. Signal paths 826 are formed in each of CMT PCIe modules 810*a-d* to route signals between the on module CMT connectors 802*a-d* and CMT connector 806, eventually reaching motherboard 812. These signals are further connected to a pads or pins on a CPU (Central Processing Unit) or GPU or XPU 830 mounted to motherboard 812 via wiring in motherboard 812 (wiring not shown). The signal paths to the PCIe ASIC that are coupled to the CMT contact pads are shown as stubs 832 for simplicity in FIG. 8—a representation of these signal paths is shown in FIG. 8*b* below. Under the routing paths that are illustrated, the signals between motherboard 812 that reach CMT PCIe modules 810*a-d* are split in four 4×PCIe links within the same board footprint using the stacked structure employed by stacked assembly 800. In some embodiments, stacked PCIe modules may include module chips and circuitry with different configurations and/or support different functions.

FIGS. 8*a*, 8*b*, and 8*c* shows further details of an assembly 850 comprising a CMT PCIe module 810 with on module CMT connector 802. CMT PCIe module 810 includes a substrate 852 (e.g., a PCB or any other type of suitable substrate) in which holes 854 and 856 are formed. In one embodiment, holes 854 and 856 are illustrative of two holes that are sized for the shoulders of screws or other types of fasteners. Under another embodiment, four holes are used, two of which are sized for the shoulders of screws or other types of fasteners and two of which are size for alignment pins/dowels or the like.

Pins 822 include a conductive portion or member that extends downward below the CMT connector body into array of vias formed on top of substrate 852 and are coupled to respective signal paths 826 using an array of solder balls 858. For example, in one embodiment, a pin 822 includes a tube that extends below the connector body with a spring contact 824 inserted into a top portion of the tube. In another embodiment, pins 822 are a single piece with an integrated spring contact (or otherwise have a spring-type characteristic to enable the top of the pins to be compressed).

There are two arrays of CMT contact pads 860 and 862 formed on the underside of substrate 852. CMT contact pads in array 862 are connected to pins 822 via signal paths 826 formed in substrate 852. Signal paths 826 are used to connect signals to on board CMT connector 802 and bypass non-targeted CMT PCIe modules. For simplicity, these paths are shown as two-dimensional (2D) paths. In practice, some of the paths may employ 3D routing. As will be recognized by those skilled in the PCB arts, 3D routing may employ a combination of internal vias that are connected via 2D path segments in different layers of substrate 852 (e.g., different layers of a PCB).

FIG. 8*b* shows 2D signal paths 864 that are coupled between pins or pads on an PCIe ASIC 813 and CMT contact pads in array 860. These signal paths are used for signals from CMT contact pads in array 860 to a target PCIe ASIC. As above, in practice signal paths 864 may employ 3D routing. It will also be recognized that the number of signal paths illustrated in the Figures herein are less than what would be used in an actual implementation.

FIG. 8*c* shows a side cross-section view of assembly 850. As shown in this example, a PCIe ASIC 813 and three chips 614 are coupled to substrate 852. In some embodiments, all of data signals and control signals for a given CMT PCIe module are handled by PCIe ASIC 813, which operates as a PCIe or CXL interface for the rest of the circuitry on the CMT PCIe module, such as represented by chips 814. Wiring in substrate 852 (not shown) is used to connect pads/solder balls on PCIe ASIC 813 to pads/solder balls on chips 814. A portion of the pad/solder balls used for PCIe ASIC 813 and chips 814 is used to provide input voltages and ground to these components. A CMT PCIe module may include various other circuitry (not shown) such as an on-board clock or clock recovery circuit that is able to extract a clock signal from a PCIe link.

As with assembly 700 illustrated in FIGS. 7*a* and 7*b*, the top CMT PCIe module in the stack (e.g., CMT PCIe module 810*a* in stacked assembly 800) may not include an on module CMT connector in some embodiments. The PCIe links may be split under additional configurations beyond two 8×PCIe links or four 4×PCIe links. For example, an ×16 PCIe link may be split as two 4×PCIe links and a single 8×PCIe link. In addition, the stacked assemblies illustrated herein may be scaled to support additional PCIe lanes, such as splitting a 32 lane (×32) PCIe link. In this case, the CMT connector and on module CMT connectors may include additional CMT contact pads and CMT pins.

Figure 9:
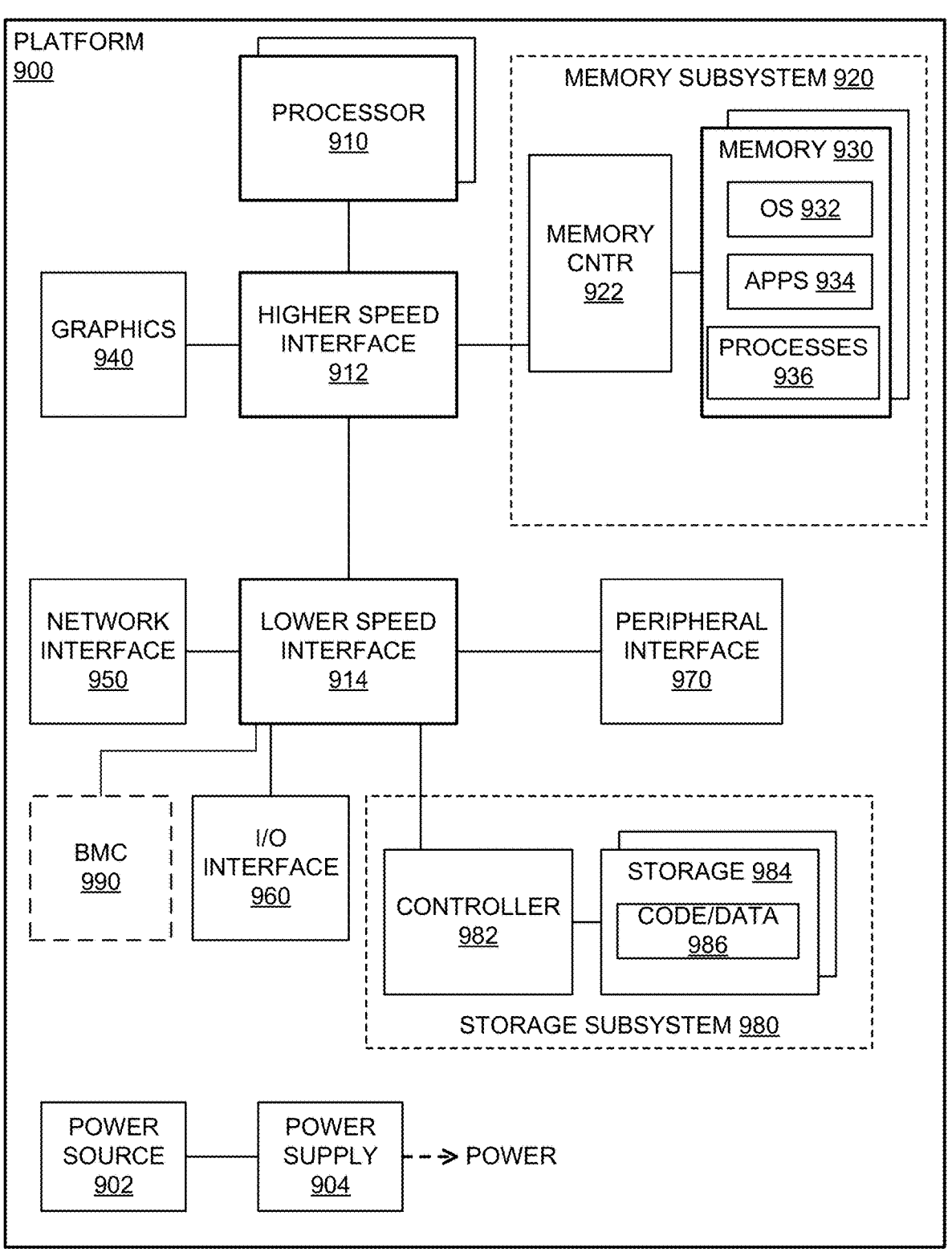
* and FIG. 9 is a diagram of an exemplary compute platform in which embodiments disclosed herein may be implemented.

FIG. 9 illustrates an example compute platform 900 in which aspects of the embodiments may be practiced. Compute platform 900 represents a computing device or computing system in accordance with any example described herein, and can be a server, laptop computer, desktop computer, or the like. More generally, compute platform 900 is representative of any type of computing device or system employing one or more AICs.

Compute platform 900 includes a processor 910, which provides processing, operation management, and execution of instructions for compute platform 900. Processor 910 can include any type of microprocessor, central processing unit (CPU), graphics processing unit (GPU), processing core, or other processing hardware to provide processing for compute platform 900, or a combination of processors. Processor 910 controls the overall operation of compute platform 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, compute platform 900 includes interface 912 coupled to processor 910, which can represent a higher speed interface or a high throughput interface for system components that needs higher bandwidth connections, such as memory subsystem 920 or graphics interface components 940. Interface 912 represents an interface circuit, which can be a standalone component or integrated onto a processor die. Where present, graphics interface 940 interfaces to graphics components for providing a visual display to a user of compute platform 900. In one example, graphics interface 940 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touch-screen display. In one example, graphics interface 940 generates a display based on data stored in memory 930 or based on operations executed by processor 910 or both.

Memory subsystem 920 represents the main memory of compute platform 900 and provides storage for code to be executed by processor 910, or data values to be used in executing a routine. Memory 930 of memory subsystem 920 may include one or more memory devices such as DRAM DEVIMs, read-only memory (ROM), flash memory, or other memory devices, or a combination of such devices. Memory 930 stores and hosts, among other things, operating system (OS) 932 to provide a software platform for execution of instructions in compute platform 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for compute platform 900. In one example, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910.

While not specifically illustrated, it will be understood that compute platform 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper- Transport or industry standard architecture (ISA) bus, a small computer system interface (SCSI) bus, a universal serial bus (USB), or an Institute of Electrical and Electronics Engineers (IEEE) standard 1394 bus.

In one example, compute platform 900 includes interface 914, which can be coupled to interface 912. Interface 914 can be a lower speed interface than interface 912. In one example, interface 914 represents an interface circuit, which can include standalone components and integrated circuitry. In one example, multiple user interface components or peripheral components, or both, couple to interface 914. Network interface 950 provides compute platform 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can exchange data with a remote device, which can include sending data stored in memory or receiving data to be stored in memory.

In one example, compute platform 900 includes one or more I/O interface(s) 960. I/O interface(s) 960 can include one or more interface components through which a user interacts with compute platform 900 (e.g., audio, alphanumeric, tactile/touch, or other interfacing). Peripheral interface 970 can include any hardware interface not specifically mentioned above. Peripherals refer generally to devices that connect dependently to compute platform 900. A dependent connection is one where compute platform 900 provides the software platform or hardware platform or both on which operation executes, and with which a user interacts.

In one example, compute platform 900 includes storage subsystem 980 to store data in a nonvolatile manner. In one example, in certain system implementations, at least certain components of storage subsystem 980 can overlap with components of memory subsystem 920. Storage subsystem 980 includes storage device(s) 984, which can be or include any conventional medium for storing large amounts of data in a nonvolatile manner, such as one or more magnetic, solid state, or optical based disks, or a combination. Storage device(s) 984 holds code or instructions and data 986 in a persistent state (i.e., the value is retained despite interruption of power to compute platform 900). A portion of the code or instructions may comprise platform firmware that is executed on processor 910. Storage device(s) 984 can be generically considered to be a "memory," although memory 930 is typically the executing or operating memory to provide instructions to processor 910. Whereas storage device(s) 984 is nonvolatile, memory 930 can include volatile memory (i.e., the value or state of the data is indeterminate if power is interrupted to compute platform 900). In one example, storage subsystem 980 includes controller 982 to interface with storage device(s) 984. In one example controller 982 is a physical part of interface 914 or processor 910 or can include circuits or logic in both processor 910 and interface 914. In one example, a storage device 984 may comprise an AIC such as an NVMe SSD that is mounted to the motherboard using a CMT connector using the assemble architecture shows in the Figures herein and discussed above.

Compute platform 900 may include an optional Baseboard Management Controller (BMC) 990 that is configured to effect the operations and logic corresponding to the flowcharts disclosed herein. BMC 990 may include a microcontroller or other type of processing element such as a processor core, engine or micro-engine, that is used to execute instructions to effect functionality performed by the BMC. Optionally, another management component (stand-alone or comprising embedded logic that is part of another component) may be used.

Power source 902 provides power to the components of compute platform 900. More specifically, power source 902 typically interfaces to one or multiple power supplies 904 in compute platform 900 to provide power to the components of compute platform 900. In one example, power supply 904 includes an AC to DC (alternating current to direct current) adapter to plug into a wall outlet. Such AC power can be renewable energy (e.g., solar power) power source 902. In one example, power source 902 includes a DC power source, such as an external AC to DC converter. In one example, power source 902 can include an internal battery or fuel cell source.

Generally, in addition to CPUs, the teaching and prin-ciples disclosed herein may be applied to Other Processing Units (collectively termed XPUs) including one or more of Graphic Processor Units (GPUs) or General Purpose GPUs (GP-GPUs), Tensor Processing Units (TPUs), Data Process-ing Units (DPUs), Infrastructure Processing Units (IPUs), Artificial Intelligence (AI) processors or AI inference units and/or other accelerators, FPGAs and/or other program-mable logic (used for compute purposes), etc. While some of the diagrams herein show the use of GPUs, this is merely exemplary and non-limiting. Generally, any type of XPU may be used in place of a GPU in the illustrated embodi-ments. Moreover, as used in the following claims, the term "processor" is used to generically cover CPUs, GPUs, and various forms of other XPUs.

Although some embodiments have been described in reference to particular implementations, other implementa-tions are possible according to some embodiments. Addi-tionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to compo-nent C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodi-ments" are not necessarily all referring to the same embodi-ments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteris-tic is not required to be included. If the specification or claim refers to "a" or "an" element, that does not mean there is only one of the element. If the specification or claims refer to "an additional" element, that does not preclude there being more than one of the additional element.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illus-trative purposes, various equivalent modifications are pos-sible within the scope of the invention, as those skilled in the relevant art will recognize.

These modifications can be made to the invention in light of the above detailed description. The terms used in the following claims should not be construed to limit the inven-tion to the specific embodiments disclosed in the specifica-tion and the drawings. Rather, the scope of the invention is to be determined entirely by the following claims, which are to be construed in accordance with established doctrines of claim interpretation.

What is claimed is:

1. An add-in card (AIC), comprising:
a plurality of integrated circuit (IC chips), each having a plurality of input/output (I/O) pads or pins;
a board to which the plurality of IC chips are operatively coupled, including an array of contact mount technol-ogy (CMT) contact pads having a first pattern and disposed on a surface of the board toward a first end of the board and including wiring connecting CMT pads to the I/O pins or pads on the IC chips; and
an on module CMT connector including an array of spring-loaded contacts arranged in a third pattern matching the first pattern,
wherein the AIC is configured to be installed in a compute platform including a CMT connector coupled to a motherboard and having an array of spring-loaded contacts arranged in a second pattern matching the first pattern, and wherein when the AIC is installed in the compute platform the CMT connector is disposed between the motherboard and the AIC and the spring-loaded contacts are in compression contact with respec-tive CMT contact pads.

2. The AIC of claim 1, wherein the board further includes first and second holes disposed toward the first end of the board and proximate to the array of CMT contact pads, and wherein the first and second holes are sized to fit a shoulder of a fastener used to secure the AIC to the motherboard.

3. The AIC of claim 1, wherein the board has a form factor that is substantially the same as an AIC having a board including a Peripheral Component Interconnect Express (PCIe) M.2. edge connector.

4. The AIC of claim 1, wherein the IC chips comprise non-volatile memory chips and the AIC comprises a solid-state drive (SSD).

5. The AIC of claim 1, wherein one of the plurality of IC chips includes a Peripheral Component Interconnect Express (PCIe) interface and the AIC is configured to support a PCIe protocol.

6. The AIC of claim 1, wherein one of the plurality of IC chips includes a Compute Express Link (CXL) interface and the AIC is configured to support a CXL protocol.

7. The AIC of claim 1, wherein the array of contacts pads is split into first and second arrays of CMT contact pads, and wherein the board includes first wiring that couples signal paths between CMT contact pads in the first array of CMT contact pads to one or more of the plurality of IC chips and second wiring that couples CMT contact pads in the second array of CMT contact pads to at least a portion of the spring-loaded contacts in the on module CMT connector.

8. The AIC of claim 7, wherein the CMT contact pads in the first array of CMT contact pads are used to support transmit and receive signals corresponding to a Peripheral Component Interconnect Express (PCIe) or a Compute Express Link (CXL) multi-lane link.

9. An apparatus, comprising:
a substrate to which a Peripheral Component Interconnect Express (PCIe) integrated circuit (IC) including a PCIe interface is mounted, the substrate having first and second arrays of CMT contact pads on an underside thereof;
first wiring in the substrate communicatively coupling the PCIe IC to CMT contact pads in the first array of CMT contact pads;
an on module CMT connector mounted to the substrate and having an array of spring-loaded contacts or pins extending above a top surface thereof; and
second wiring in the substrate coupling spring-loaded contacts or pins in the on module CMT connector to CMT contact pads in the second array of CMT contact pads.

10. The apparatus of claim 9, wherein the spring-loaded contacts or pins include or are operatively coupled to conductive members extending downward below the on module CMT connector, and wherein the on module CMT connector is coupled to the substrate via an array of solder balls that are formed around the conductive members.

11. The apparatus of claim 9, wherein the CMT contact pads in the first array of CMT contact pads are used to support transmit and receive signals corresponding to a PCIe or a Compute Express Link (CXL) multi-lane link.

12. The apparatus of claim 11, wherein the apparatus is configured to be stacked with a second apparatus disposed above a first apparatus with the first and second arrays of CMT contact pads on the underside of the substrate in the second apparatus in contact with the array of spring-loaded contacts or pins in the on module CMT connector on the first apparatus.

13. The apparatus of claim 12, wherein the PCIe or CXL multi-lane link comprises a four-lane (4×) link; and wherein the second wiring includes signal paths supporting up to 12 lanes of PCIe or CXL transmit and receive signals.

14. The apparatus of claim 12, wherein the PCIe or CXL multi-lane link comprises an eight-lane (8×) link; and wherein the second wiring includes signal paths supporting up to 8 lanes of PCIe or CXL transmit and receive signals.

15. The apparatus of claim 12, wherein the second wiring is swizzled such that at least a portion of the CMT contact pads in the second array of contact pads are coupled to spring-loaded contacts or pins in the on module CMT connector that are disposed above the first array of contact pads.

16. A compute platform, comprising
a motherboard having a plurality of components and circuitry mounted or operationally coupled thereto and including an array of compression mount technology (CMT) contact pads;
a processor, operatively coupled to the motherboard, the processor having pins or pads that are electrically coupled to CMT contact pads in the array of CMT contact pads via wiring in the motherboard; and
first and second CMT Peripheral Component Interconnect Express (PCIe) modules, each including a printed circuit board (PCB) to which a PCIe integrated circuit (IC) is mounted, the PCB having first and second arrays of CMT contact pads on an underside thereof;
a first on module CMT connector mounted to a topside of the first CMT PCIe module including an array of spring-loaded contacts or pins; and
a CMT connector including an array of spring-loaded contacts or pins, interposed between the first CMT PCIe module and the PCB proximate to the array of CMT contact pads on the motherboard,
wherein the second CMT PCIe module is stacked above the first on module CMT connector such that the first and second arrays of CMT contact pads for the second CMT PCIe module are in contact with the spring-loaded contacts or pins in the first on module CMT connector.

17. The compute platform of claim 16, wherein the compute platform further comprises three of more CMT PCIe modules in a stacked assembly under which an on module CMT connector is disposed between pairs of CMT PCIe modules.

18. The compute platform of claim 17, wherein the first CMT PCIe module includes:
first wiring in the PCB communicatively coupling the PCIe IC to CMT contact pads in the first array of CMT contact pads; and
second wiring in the PCB coupling spring-loaded contacts or pins in the first on module CMT connector to CMT contact pads in the second array of CMT contact pads.

19. The compute platform of claim 17, including a stack of four CMT PCIe modules in the stacked assembly, wherein wiring in the stacked assembly supports signal paths to facilitate a respective four-lane (4×) PCIe link for the four CMT PCIe modules.

\* \* \* \* \*